June 16, 1953 W. A. RAY 2,641,871
PRESSURE GOVERNOR
Filed July 29, 1950 2 Sheets-Sheet 1

WILLIAM A. RAY,
INVENTOR.

BY John Flam
ATTORNEY

June 16, 1953 W. A. RAY 2,641,871
PRESSURE GOVERNOR
Filed July 29, 1950 2 Sheets-Sheet 2

WILLIAM A. RAY,
INVENTOR.

BY John Flam
ATTORNEY

Patented June 16, 1953

2,641,871

UNITED STATES PATENT OFFICE 2,641,871

PRESSURE GOVERNOR

William A. Ray, North Hollywood, Calif., assignor to General Control Co., a corporation of California Application July 29, 1950, Serial No. 176,687

3 Claims. (Cl. 50—26)

This invention relates to a pressure regulator, such as is commonly used for controlling or regulating the flow of a gaseous fuel to a burner. Such a regulator includes a valve mechanism that is adapted automatically to maintain the pressure at which gaseous fuel is supplied to a burner at a substantially constant value above atmospheric pressure.

In the past, such pressure regulators have been characterized by a marked degree of turbulence within the apparatus, rendering accurate control of pressure difficult, if not impossible. Such turbulence is due, in a large measure, to the flow of fuel through sinuous routes. It is, accordingly, an object of this invention to improve in general the operating characteristics of such pressure regulators. For this purpose, novel pressure responsive mechanisms are used whereby control of the flowing fuel can be achieved without causing the fuel to deviate from a substantially straight path through the device. Accordingly, accurate control of the pressure of the flowing fuel can be achieved.

It is another object of this invention to provide a pressure governor or regulator wherein the inlet and outlet passageways thereto are substantially coaxial, the flow of fuel following substantially the axis defined by the inlet and the outlet. In this manner turbulence is reduced, and accurate control can be achieved.

It is still another object of this invention to provide a device of this character that is simple in structure, promoting economy of manufacture, and ease of installation and repair.

It is still another object of this invention to provide a pressure regulator or governor utilizing a flexible diaphragm subjected to outlet pressure and a sliding valve mechanism movable in response to the positioning of the flexible diaphragm.

This invention possesses many other advantages and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings.

Figure 1:
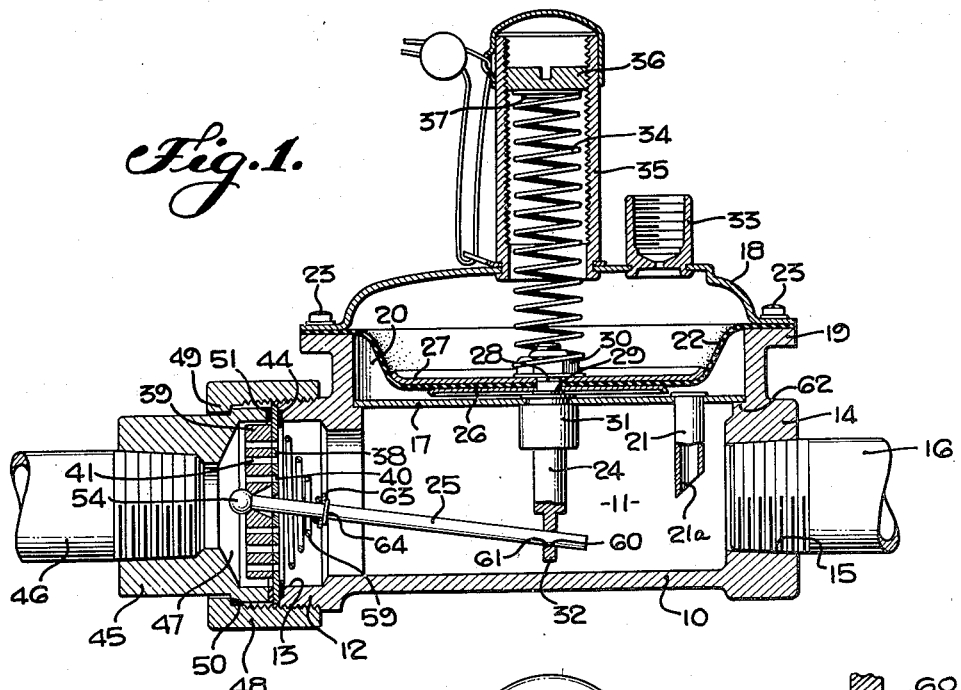
Figure 1 is a longitudinal sectional view of an apparatus embodying this invention, illustrating the mechanism in maximum valve opening position.

The valve body 10 provides a central chamber 11 through which fluid is adapted to pass. The valve body 10 carries an integrally formed nipple 12, defining an inlet 13 to the central chamber 11. Substantially coaxial with the inlet 13 is an apertured boss 14, defining an outlet 15 at the opposite side of the chamber or passageway 11. The boss 14 may be interiorly threaded to provide a fitting for a discharge connection 16.

A plate 17, disposed on an annular shoulder 62 within the body 10, defines the chamber 11. A cover or casing 18 is disposed on a peripheral flange 19 of the valve body.

A flexible diaphragm 22 is secured at its periphery between the cover 18 and the flange 19 of the valve body, as by the aid of bolts 23, clamping the diaphragm 22 in fluid-tight relation between the cover 18 and the flange 19. The diaphragm 22, together with the plate 17 defines a chamber 20.

From the plate 17, a conduit 21 depends, the conduit having an opening 21a adjacent the outlet 15. This conduit provides a through passageway to subject the chamber 20 to the pressure of fluid fuel passing to the outlet 15.

The diaphragm 22 carries a stem 24 for moving a valve operator 25 to position the valve elements of the apparatus in a manner hereinafter to be described. For securing such stem 24 to the diaphragm 22, a pair of cupped discs 26 and 27 are respectively disposed on opposite sides thereof. The stem 24 has a threaded shank portion 28 extending through the discs 26 and 27, as well as an aperture in the diaphragm 22. An annular shoulder 29 of the stem engages the disc 26. Securing the stem 24 to the discs 26 and 27, as well as maintaining a fluid-tight relation at the place where the shank 28 extends through the diaphragm 22, is a hexagonal nut 30 threaded onto the shank 28.

Figures 1A, 2:
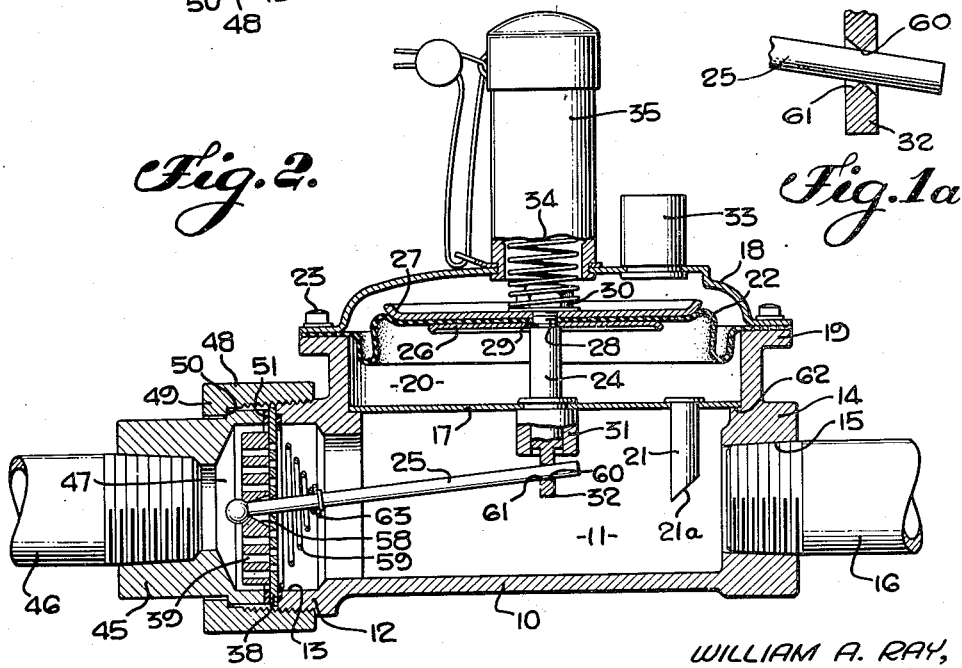
Fig. 1a is an enlarged fragmentary sectional view of a portion of the apparatus shown in Fig. 1.
Fig. 2 is a longitudinal section similar to Fig. 1, but illustrating the mechanism in minimum valve opening position.

As shown most clearly in Fig. 2, a bushing 31, secured to the plate 17, serves to guide the stem 24 for longitudinal movement with the diaphragm 22. The stem 24 carries an apertured extension 32 which is disposed in the central chamber 11 for any position of the diaphragm 22. This extension 32 cooperates with the valve operator 25 in a manner to be hereinafter described.

The cover 18 carries a vent 33 so that the diaphragm 22 is acted upon by a fluid pressure corresponding to the difference between the pressure at the outlet 15 and the pressure of the ambient air. A light helical compression spring 34 abuts the disc 27, the nut 30 extending a few turns within the spring 34 to prevent lateral movement of the spring 34. A tubular interiorly threaded housing 35 for spring 34 carries a threaded plug 36, providing a seat 37 for the spring 34 (see Fig. 1). Pressure imposed upon the diaphragm 22 through the medium of the conduit 21 will cause the diaphrgam 22, discs 26, 27, stem 24, and the extension 32 to assume a position in which the spring 34 counterbalances such pressure, all in a well known manner. Adjustment of the plug 36 longitudinally of the housing 35 will adjust the equilibrium position of the diaphragm 22 for any given pressure.

Figure 3:
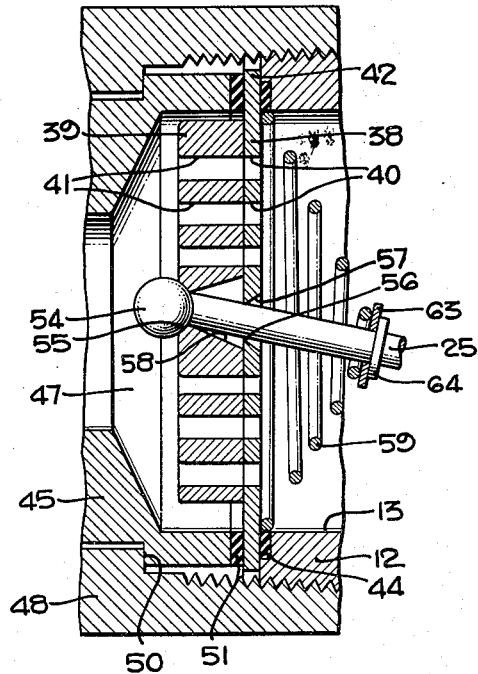
Fig. 3 is an enlarged fragmentary sectional view showing the valve mechanism in the position of Fig. 1.
Figure 4:
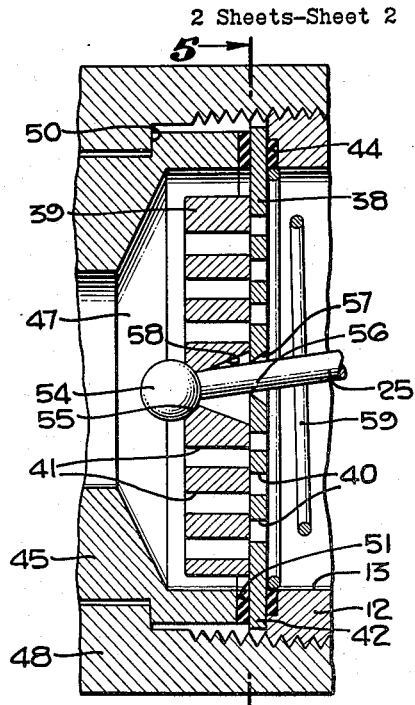
Fig. 4 is an enlarged fragmentary sectional view similar to Fig. 3, showing the valve mechanism in the position of Fig. 2.

Control of the flow of fluid through the device is accomplished by a pair of contacting, relatively slideable plates 38 and 39, each having a plurality of spaced parallel elongated apertures 40 and 41, respectively, that are adapted to be moved between maximum and minimum registry, shown clearly in Figs. 3 and 4 respectively. For accurately positioning the stationary plate 38, as shown most clearly in Fig. 5, the plate 38 carries a plurality of ears 42 that are received by appropriate recesses or slots 43 provided in the face of the nipple 12. An appropriate sealing gasket 44 may be disposed between the plate 38 and the nipple 12. An interiorly threaded fitting 45 (see Figs. 1 and 2), with which an inlet conduit 46 may cooperate, provides a chamber 47 in which the sliding plate 39 is accommodated to cooperate with the plate 38. The fitting 45 is shown as secured to the nipple 12 by the aid of a coupling 48 threaded onto the nipple 12, the coupling 48 carrying an annular collar 49 engageable with an annular shoulder 50 of the fitting 45. Accordingly the chamber 47 is aligned with the inlet 13 by causing the fittting to abut the plate 38 through the intermediary of a sealing gasket 51.

Figure 5:
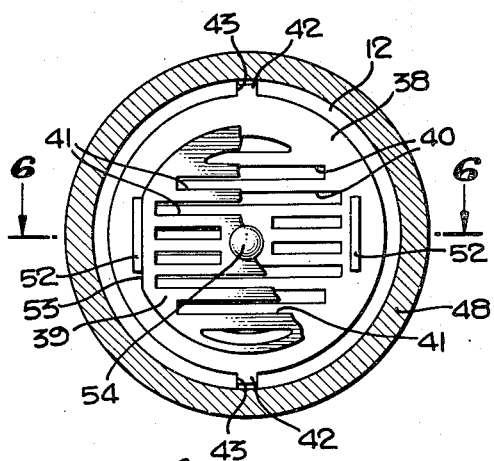
Fig. 5 is a sectional view, taken along a plane indicated by line 5—5 of Fig. 4.
Figure 6:
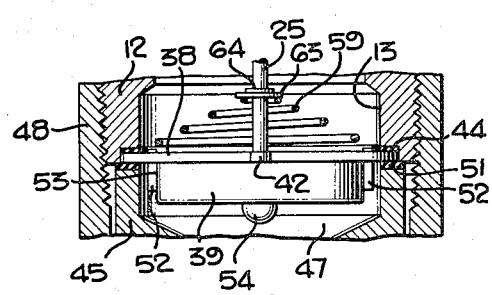
Fig. 6 is a sectional view, taken along the plane indicated by line 6—6 of Fig. 5.

As shown most clearly in Fig. 5, the apertures 40 of the plate 38 are in this instance elongated, substantially parallel, and also substantially equally spaced. The apertures 41 of the plate 39 are similarly proportioned. Other forms of cooperating apertures can, of course, be used. It is apparent that the degree of registry of the apertures 40 and 41 will control the dynamic characteristics of the flowing fluid. Movement of the plate 39 upwards, as viewed in Fig. 5, perpendicular to the longitudinal apertures 40 will cause complete registry of the apertures 40 and 41. For guiding the plate 39 for sliding movement in such a direction, a pair of guide members 52 are attached to the plate 38. These guide members 52 cooperate with parallel side portions 53 of the plate 39 to confine the plate 39 for sliding movement in one direction along the plate 38.

The apertures 41 of the plate 40 extend substantially at right angles to the side portions 53.

The valve operator 25 causes movement of the movable plate 39. The operator 25 carries, at one end, a plate-engaging surface formed of a ball 54. This ball seats on a cup seat 55 formed on that face of the plate 39 that is displaced from the stationary plate 38, the seat 55 being substantially centrally disposed on the plate 39. The operator 25 causes movement of the ball 54 and the plate 39 through pivotal movement about an annular knife edge 56 formed in the center of the stationary plate 38 by a tapered recess 57. The tapered recess 57 and a tapered recess 58, communicating with the seat 55, provide clearance for accommodating the operator 25 for any relative position of the plates 38 and 39, as illustrated in Figs. 3 and 4.

The valve operator 25 is urged by a spiral compression spring 59 to cause the ball 54 tightly to seat to ensure cooperation with the plate 39 and to maintain contact between the plates 38 and 39. The spring 59 abuts the plate 38 at one end, and, at the other end, abuts a washer 63 carried by the operator 25. Movement of the washer 63 longitudinally of the operator is limited by a collar 64 carried by the operator 25.

The extension 32 of the stem 24 has an aperture 61 for accommodating the end of the operator 25. As shown most clearly in Fig. 1a, the aperture 61 is tapered to form an annular knife edge 60 cooperating with the operator 25. The aperture 61 being tapered, suitable clearance for the operator 25 is provided for any angular position thereof about the knife edge 60. Accordingly, longitudinal movement of the stem 24, carried by the diaphragm 22, causes corresponding movement of the operator 25 about the knife edge 56 to move the movable plate 39 with respect to the stationary plate 38 to adjust the registry of the apertures 40 and 41.

Assume that the position of the diaphragm 22 is in equilibrium, the forces acting on opposite sides of it being the same, and that there now occurs an increase in the inlet pressure in chamber 47. This causes an increase in the pressure in chamber 11, and diaphragm 22 must accordingly move upward; this causes a reduction in the slide openings and a corresponding reduction of pressure in chamber 11. The diaphragm 22 will reach a position such that pressure in chamber 11 exactly counterbalances the force acting above the diaphragm 22. The pressure in chamber 11 is therefore maintained at a pressure near that of the original equilibrium condition. Although this pressure in chamber 11 is slightly increased, it is nevertheless in the usable range.

On the contrary, should there be a reduction in the pressure in chamber 47, the pressure in chamber 11 decreases, causing an increase in the slide openings and a corresponding increase of the pressure in chamber 11. The pressure in chamber 11 is therefore maintained at a pressure near that of the original equilibrium condition. Although this pressure in chamber 11 is slightly decreased, it is nevertheless in the usable range.

The inventor claims:

1. In a valve structure: a valve body having an inlet passage and an outlet passage and a chamber between said inlet and outlet passages; a first ported member detachably secured to said body and extending across said inlet passage; a second member having ports adapted to register with said first ported member, said second ported member contacting said first ported member;

said members having means guiding said second ported member for rectilinear sliding movement with respect to said first ported member; an arm having a free end extending into said chamber; means providing a pivotal support for said arm in said first ported member for movement of said arm angularly about an axis substantially normal to said arm and normal to the direction of relative movement of said members; said arm and said second ported member having provisions for connecting said second ported member and said arm for movement of said second ported member with respect to said first ported member in accordance with the angular position of said arm; and an operator guided for linear movement transversely of said arm and providing a support for movement of the free end of said arm therewith.

2. In a valve structure: a valve body having an inlet passage and an outlet passage and a chamber between said inlet and outlet passages; a first ported member detachably secured to said body and extending across said inlet passage; a second member having ports adapted to register with said first ported member, said second ported member contacting said first ported member; said members having means guiding said second ported member for rectilinear sliding movement with respect to said first ported member; an arm having a free end extending into said chamber; means providing a pivotal support for said arm in said first ported member for movement of said arm angularly about an axis substantially normal to said arm and normal to the direction of relative movement of said members; said arm and said second ported member having provisions for connecting said second ported member and said arm for movement of said second ported member with respect to said first ported member in accordance with the angular position of said arm; and an operator extending into said chamber and guided for linear movement transversely of said arm, said operator having an aperture accommodating said free end of said arm for movement of said arm therewith.

3. In a pressure regulator: a valve body having an inlet passage and an outlet passage aligned with said inlet passage and a chamber between said inlet and outlet passages; a first plate detachably secured to said body and extending across said inlet passage, said plate having through ports; a second plate having through ports adapted to register with said first plate, said second plate having a surface adapted to contact said first plate; said members having means guiding said second plate for linear sliding movement with respect to said first plate; an arm having a free end extending into said chamber, said arm extending through said first plate; said first plate having an aperture accommodating said arm and providing a pivotal support therefor; means connecting the other end of said arm to said second plate, including means providing a spherical surface on said arm and means providing a cooperating seat in said second plate, said connecting means being so arranged that movement of said spherical surface into engagement with said seat urges said second plate against said first plate; resilient means urging said arm toward seating relation; and an operator for said arm, said operator extending into said chamber and movable transversely thereof, said operator having an aperture accommodating and supporting the free end of said arm.

WILLIAM A. RAY.

References Cited in the file of this patent

UNITED STATES PATENTS

| Number | Name | Date |
|---|---|---|
| 282,069 | Frost | July 31, 1883 |
| 478,856 | Gustafsson | July 12, 1892 |
| 825,559 | Schrader | July 10, 1906 |
| 2,503,881 | Manis | July 11, 1950 |